United States Patent [19]

Gould

[11] Patent Number: 4,599,953
[45] Date of Patent: Jul. 15, 1986

[54] GARBAGE TO HYDROCARBON FUEL CONVERSION SYSTEM

[76] Inventor: William A. Gould, 486 - 14th St., Brooklyn, N.Y. 11215

[21] Appl. No.: 752,773

[22] Filed: Jul. 8, 1985

[51] Int. Cl.$^4$ .............................................. F23B 7/00
[52] U.S. Cl. ................................... 110/234; 110/204; 110/212; 110/216; 110/229; 110/235; 110/306
[58] Field of Search ............... 110/204, 210, 211, 212, 110/215, 216, 229, 230, 222, 232, 233, 234, 242, 259, 110, 150, 165 R, 306

[56] References Cited

U.S. PATENT DOCUMENTS

| Re. 29,502 | 12/1977 | Jaronko et al. | 110/222 X |
|---|---|---|---|
| 3,601,069 | 8/1971 | Mancuso | 110/212 X |
| 4,245,570 | 1/1981 | Williams | 110/204 X |
| 4,291,539 | 9/1981 | Potter | 110/229 X |
| 4,471,702 | 9/1984 | McKinlay | 110/211 X |
| 4,505,230 | 3/1985 | Caplin | 110/204 X |
| 4,531,463 | 7/1985 | Kratz et al. | 110/212 |

Primary Examiner—Albert J. Makay
Assistant Examiner—Steven E. Warner
Attorney, Agent, or Firm—Richard L. Miller

[57] ABSTRACT

A garbage to hydrocarbon fuel conversion system is provided which generates electricity and hydrocarbon gases from combustible garbage. The garbage is pulverized and then burned in a destructive distillation process. The heat produced is used to generate electrical power. Dust precipitated by an electrostatic cottrell precipitator is mixed with light oil and burned in an oil burner. The heat obtained is used to maintain the destructive distillation. The gases which rise to the top of the precipitator are passed through a hydroxide solution which leaves a layer of tar and oil floating on top of the solution and a volume of hydrocarbon gases on top of this layer.

2 Claims, 1 Drawing Figure

U.S. Patent  Jul. 15, 1986  4,599,953
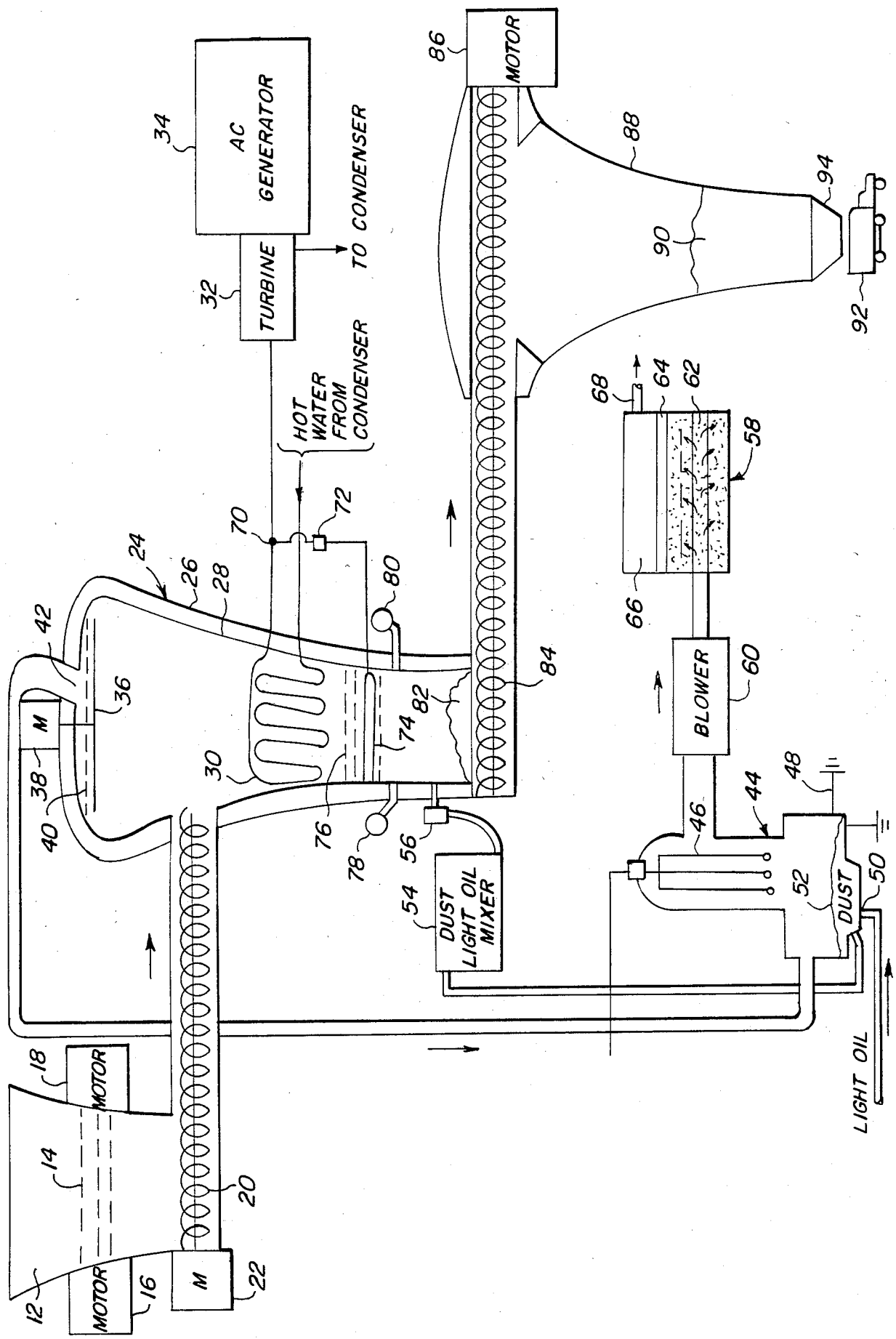

GARBAGE TO HYDROCARBON FUEL CONVERSION SYSTEM

BACKGROUND OF THE INVENTION

The present invention relates generally to the field of energy recovery schemes and, more specifically to systems which generate electricity by burning garbage while producing saleable hydrocarbon gases.

At the present time, western countries are experiencing spiraling fuel costs at the same time that they are literally drowning in a sea of garbage. Much of the garbage generated represents a wasted energy resource which becomes abundantly clear when garbage is buried in a dump and the trapped decomposition gases, principally methane, are released and sometimes ignite in an uncontrollable fire.

A number of systems have been described which purport to solve this problem by burning combustible garbage to provide both energy and fuel but all have suffered from serious shortcomings. The principal difficulties have been in the areas of low efficiencies, excessive pollution products, and difficulty in accumulating and disposing of final ash waste products.

SUMMARY OF THE INVENTION

It is, therefore, a primary object of the present invention to provide a garbage to hydrocarbon fuel conversion system which efficiently uses combustible garbage to generate electricity.

A further purpose is to provide a garbage to hydrocarbon fuel conversion system which efficiently uses combustible garbage to generate hydrocarbon gases.

A still further purpose is to provide a garbage to hydrocarbon fuel conversion system which easily transports waste ash to an ash bin for easy disposal.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The FIGURE on the drawing is briefly described as follows:

The FIGURE is a block diagram of the invention.

DETAILED DESCRIPTION OF THE PREFERRED EMBODIMENTS

Combustible garbage is dumped into combustible garbage bin 12 where it is pulverized by rotary gratings typified by 14 which are powered by motors 16 and 18. The pulverized garbage is transported by worm feed automatic stroker 20, powered by motor 22 to furnace 24. Furnace 24 has a steel shell 26 and fire brick walls 28. The pulverized garbage is burned in a destructive distillation process at a temperature of approximately 1800° C.

This high temperature heats water contained in steam generating coils 30, and the water turns to live steam which is sent to turbine 32 which powers alternating current generator 34 which generates saleable power. Remaining steam from turbine 32 is sent through a condenser where it returns to the liquid state and is returned to the steam generating coils 30.

Unburned hydrocarbons and fine dust rise to the top of furnace 24 where they rise through a filter 36 powered by motor 38 and through a grate filter 40 before exiting through exhaust port 42 into cottrell precipitator 44. The powerful electrostatic field generated by the high voltage placed between the electrodes 46 and ground 48 causes incoming light oil at 50 to mix with the precipitated fine dust 52. This mixture is homogenized by dust and light oil mixer 54 before it enters oil burner 56 which projects into furnace 24. The heat so generated is used to keep the destructive distillation process operating. Meanwhile, the gas which rises to the top of cottrell precipitator 44 is exhausted into hydroxide tank 58 by blower 60. In hydroxide tank 58 these gases bubble through the hydroxide solution 62 leaving a floating layer 64 of tar and oil and a volume of hydrocarbon gas 66 which may be piped through 68 for storage. In order to burn off the heavier hydrocarbons present in the furnace 24 and to precipitate out waste ash, live steam is vented into the furnace via junction 70, valve 72, and high pressure sprayer 74. Rotating grates, typified by 76, located in the region of high pressure sprayer 74 pulverize any waste ash present. Gas burners 78 and 80 burn the heavy waste gases and the heat so generated helps to maintain the destructive distillation process.

Waste ash falls into ash pit 82 and is transported by worm feed automatic ash remover 84, powered by motor 86 to ash bin 88. Ash 90 is loaded into vehicle 92 via chute 94.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. Garbage to hydrocarbon fuel conversion system, comprising in combination:
   (a) a source of combustible garbage;
   (b) means for pulverizing said garbage;
   (c) a furnace to burn said garbage;
   (d) means for transporting said pulverized garbage to said furnace which comprises a motor operated worm feed automatic stoker;
   (e) a steam generating coil inside said furnace which supplies live steam to power a turbine which in turn powers an alternating current generator; and a condenser which returns remaining said steam to a liquid state for re-circulation through said steam generating coils;
   (f) means for collecting incompletely combusted waste gases from said furnace; precipitating out dust and light oil for re-combustion in said furnace; and, extracting hydrocarbon gas; where in said means for precipitating out dust and light oil for re-combustion in said furnace comprise a cottrell precipitator wherein oil from an external source is mixed with fine dust received from said exhaust port, wherein an electrostatic charge helps to precipitate said dust; a dust and light oil mixer which provides a homogeneous mixture; and, an oil burner mounted to said furnace whose heat output is supplied to said furnace to add energy thereto; and, (g) means for burning trapped heavy gases and removing waste ash from said furnace for disposal.

2. Garbage to hydrocarbon fuel conversion system, as recited in claim 1, wherein said means for extracting hydrocarbon gas comprise a blower which exhausts the gases from said cottrell precipitator; and a hydroxide tank which receives said gases and by bubbling said gases through a hydroxide solution leaves a layer of tar and oil floating on top of said hydroxide solution and a volume of hydrocarbon gases which fills the upper part of said hydroxide tank and may thereafter be removed and stored.

* * * * *